US012746462B2

(12) United States Patent
Guerrero

(10) Patent No.: US 12,746,462 B2
(45) Date of Patent: Sep. 29, 2026

(54) GAME CONTROLLER

(71) Applicant: Razer (Asia-Pacific) Pte. Ltd., Singapore (SG)

(72) Inventor: Gil Jr Palma Guerrero, Singapore (SG)

(73) Assignee: RAZER (ASIA-PACIFIC) PTE. LTD., Singapore (SG)

( * ) Notice: Subject to any disclaimer, the term of this patent is extended or adjusted under 35 U.S.C. 154(b) by 130 days.

(21) Appl. No.: 18/838,635

(22) PCT Filed: May 5, 2022

(86) PCT No.: PCT/SG2022/050277
§ 371 (c)(1),
(2) Date: Aug. 15, 2024

(87) PCT Pub. No.: WO2023/214929
PCT Pub. Date: Nov. 9, 2023

(65) Prior Publication Data
US 2025/0153040 A1 May 15, 2025

(51) Int. Cl.
*A63F 13/24* (2014.01)

(52) U.S. Cl.
CPC .................................... *A63F 13/24* (2014.09)

(58) Field of Classification Search
None
See application file for complete search history.

(56) References Cited

U.S. PATENT DOCUMENTS

| | | | |
|---|---|---|---|
| 8,480,491 B2 | 7/2013 | Burgess et al. |
| 9,308,450 B2 | 4/2016 | Burgess et al. |
| 9,308,451 B2 | 4/2016 | Burgess et al. |
| 9,707,479 B2 | 7/2017 | Burgess et al. |

(Continued)

FOREIGN PATENT DOCUMENTS

| | | |
|---|---|---|
| CN | 106794379 A | 5/2017 |
| CN | 107638691 A | 1/2018 |

(Continued)

OTHER PUBLICATIONS

International Written Opinion; dated Jan. 30, 2023; PCT/SG2022/050277.

(Continued)

*Primary Examiner* — Jason T Yen
(74) *Attorney, Agent, or Firm* — Polsinelli PC

(57) ABSTRACT

In some aspects, a game controller includes a trigger and a selector, wherein the trigger is operable in a first operation mode when the selector is in a first state and operable in a second operation mode when the selector is in a second state. The game controller also includes an interception member and a switch. When the selector is in the first state, the trigger is depressible to engage the interception member at a first intermediate position along a travel path and further depressible to move the interception member from the first intermediate position to a second intermediate position along the travel path in a manner so as to actuate the switch with the interception member. When the selector is in the second state, the trigger is movable along a full extend of the travel path between an undepressed position and a fully depressed position.

20 Claims, 10 Drawing Sheets

(56) References Cited

U.S. PATENT DOCUMENTS

| | | | | |
|---|---|---|---|---|
| 10,159,896 | B2 | 12/2018 | Strahle et al. | |
| 10,258,877 | B2 | 4/2019 | Burgess et al. | |
| 10,279,250 | B2 | 5/2019 | Burgess et al. | |
| 10,427,036 | B2 | 10/2019 | Burgess et al. | |
| 10,446,344 | B2 * | 10/2019 | Tsai | H01H 21/22 |
| 10,632,367 | B2 | 4/2020 | Strahle et al. | |
| 10,685,796 | B2 | 6/2020 | Tsai et al. | |
| 10,806,994 | B2 | 10/2020 | Chou et al. | |
| 10,857,454 | B2 | 12/2020 | Burgess et al. | |
| 10,870,051 | B2 | 12/2020 | Burgess et al. | |
| 11,185,766 | B2 | 11/2021 | Burgess et al. | |
| 2005/0215321 | A1 * | 9/2005 | Hussaini | A63F 13/24<br>463/37 |
| 2011/0261012 | A1 | 10/2011 | Hosoi et al. | |
| 2012/0088582 | A1 | 4/2012 | Wu et al. | |
| 2017/0151494 | A1 | 6/2017 | Ironmonger et al. | |
| 2018/0333642 | A1 * | 11/2018 | Strahle | A63F 13/25 |
| 2019/0038969 | A1 | 2/2019 | Schmitz et al. | |
| 2019/0393006 | A1 * | 12/2019 | Tsai | H01H 21/22 |
| 2020/0155929 | A1 | 5/2020 | Chan | |
| 2021/0394047 | A1 | 12/2021 | Orion et al. | |

FOREIGN PATENT DOCUMENTS

| | | | |
|---|---|---|---|
| CN | 109739630 | A | 5/2019 |
| KR | 10-2014-0112470 | A | 9/2014 |

OTHER PUBLICATIONS

First Office Action issued Jul. 20, 2026 in corresponding Taiwanese Application No. 112108815.

* cited by examiner

GAME CONTROLLER

TECHNICAL FIELD

The present disclosure generally relates to a game controller, in particular, a game controller with an input element.

BACKGROUND

Electronic games often involve interactions with user interfaces or input devices—such as a joystick, game controller, keyboard, or motion sensing device—to receive user input. Particularly, game controllers often include a plurality of buttons, paddles, thumb-sticks, wheels, pads, triggers and/or dials that may be pressed, pulled, turned or otherwise manipulated by a user to activate various functions within the game being played.

Video games or computer games vary in complexity of play, and the speed of actuation of control inputs of the controller can affect a user's performance in certain games. Therefore, there exists a need for game controllers that have improved controls and responses, thereby augmenting user experience.

SUMMARY

According to a first aspect of the present disclosure, a game controller is provided. The game controller may include a trigger movable along a travel path extending from an undepressed position to a fully depressed position; a selector operable to alternate between a first state and a second state, wherein the trigger is operable in a first operation mode when the selector is in the first state and operable in a second operation mode when the selector is in the second state; an interception member operatively associated with the selector, the interception member being moved to intercept the trigger at a first intermediate position along the travel path when the selector is in the first state and moved away from the first intermediate position to keep clear of the travel path when the selector is in the second state; a switch disposed relative to the trigger in a manner so as to be actuatable by the interception member when the selector is in the first state, wherein, when the selector is in the first state, the trigger is depressible to engage the interception member at the first intermediate position along the travel path and further depressible to move the interception member from the first intermediate position to a second intermediate position along the travel path in a manner so as to actuate the switch with the interception member, wherein, when the selector is in the second state, the trigger is movable along a full extend of the travel path between the undepressed position and the fully depressed position.

DETAILED DESCRIPTION

Figure 1:
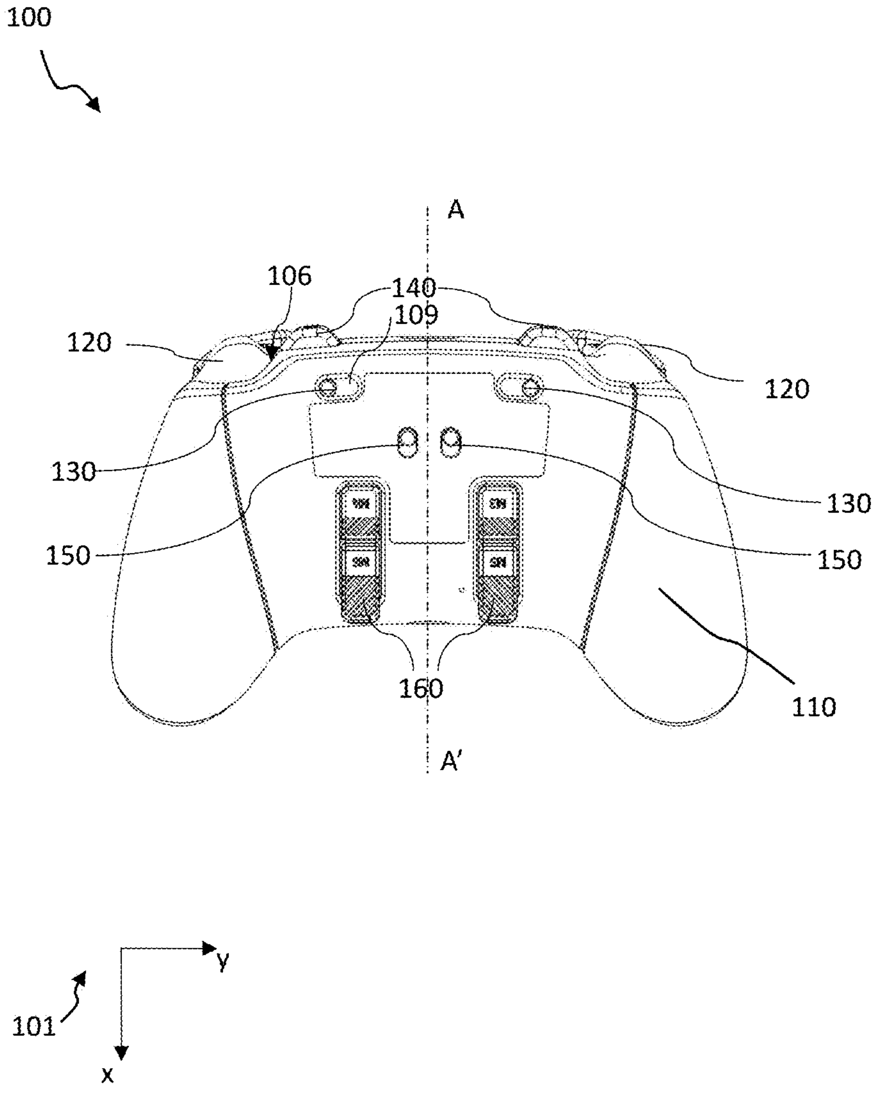
FIG. 1 is a diagram showing a back view of an example game controller according to an embodiment of the present disclosure.

Implementations described below in the context of a device, apparatus, or system are analogously valid for the respective methods, and vice versa. Furthermore, it will be understood that the implementations described below may be combined, for example, a part of one implementation may be combined with a part of another implementation, and a part of one embodiment may be combined with a part of another embodiment.

It should be understood that the terms "on", "over", "top", "bottom", "down", "side", "back", "left", "right", "front", "back", "lateral", "side", "up", "down", "vertical", "horizontal" etc., when used in the following description are used for convenience and to aid understanding of relative positions or directions, and not intended to limit the orientation of any device, or structure or any part of any device or structure. In addition, the singular terms "a", "an", and "the" include plural references unless context clearly indicates otherwise. Similarly, the word "or" is intended to include "and" unless the context clearly indicates otherwise.

It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes" or "contains" one or more steps or elements possesses those one or more steps or elements, but is not limited to possessing only those one or more steps or elements. Likewise, a step of a method or an element of a device that "comprises," "has," "includes" or "contains" one or more features possesses those one or more features, but is not limited to possessing only those one or more features. Furthermore, a device or structure that is configured in a certain way is configured in at least that way, but may also be configured in ways that are not listed.

Approximating language, as used herein throughout the specification and claims, may be applied to modify any quantitative representation that could permissibly vary without resulting in a change in the basic function to which it is related. Accordingly, a value modified by a term or terms, such as "about," "substantially", is not limited to the precise value specified but within tolerances that are acceptable for operation of the embodiment for an application for which it is intended. In some instances, the approximating language may correspond to the precision of an instrument for measuring the value.

Various aspects of what is described here seek to provide a game controller, particularly, a game controller having an input element (e. g. a trigger, a button, a key, etc.) which may be toggled or switched between a first operation mode and a second operation mode so as to be operable in the first operation mode or the second operation mode. The proposed game controller may include an input element (e. g. a trigger, a button, a key, etc.) actuatable to be moved along a travel path extending from an undepressed position to a fully depressed position; and a selector operable to alternate between a first state and a second state, wherein the input element (e. g. a trigger, a button, a key, etc.) is operable in a first operation mode when the selector is in the first state and operable in a second operation mode when the selector is in the second state. For example, when the input element is a trigger, the first operation mode may be a "Hair Trigger Mode" and the second operation mode may be a "Full Trigger Travel Mode", whereby a travel distance of the trigger is shorter in the "Hair Trigger Mode" than the "Full Trigger Travel Mode". Accordingly, in the first operation mode, the trigger may be actuatable to move between the undepressed position and an intermediate position along the travel path. On the other hand, in the second operation mode, the trigger may be actuatable to move between the undepressed position and the fully depressed position. According to various aspects, in the first operation mode, the trigger may, in addition to having a shorter travel distance, be configured to provide a click activation sensation when actuated. The click activation sensation may provide a user with better user experience and/or a way to differentiate, via sense of touch, whether the trigger is operating in the first operation mode or a second operation mode.

According to various aspects, the game controller may further include an interception member (e. g. a button assembly) operatively associated with the selector, the interception member may be moved to intercept the trigger at a first intermediate position along the travel path when the selector is in the first state and moved away from the first intermediate position to keep clear of the travel path when the selector is in the second state. The game controller may further include a switch (e. g. a mechanical-type switch) disposed relative to the trigger in a manner so as to be actuatable by the interception member when the selector is in the first state. The switch may be a clickable switch to provide the click activation sensation when actuated. When the selector is in the first state, the trigger may be depressible to engage the interception member at the first intermediate position along the travel path and further depressible to move the interception member from the first intermediate position to a second intermediate position along the travel path in a manner so as to actuate the switch with the interception member. The difference in the travel path between the first intermediate position and the second intermediate position may be adequate to actuate the switch with the interception member. When the selector is in the second state, the trigger may be movable along a full extend of the travel path between the undepressed position and the fully depressed position. Accordingly, the game controller may be operated to toggle or switch the operation mode of the trigger between the first operation mode and the second operation mode by using the selector to move the interception member to intercept the trigger along the travel path in the first operation mode or to withdraw the interception member from intercepting the trigger in the second operation mode.

According to some aspects, the proposed game controller may have at least one trigger, one or more (or multiple) selectors disposed in the housing of the game controller for toggling between different states of the selector and consequently between the different operation modes of the trigger. The trigger may be electrically coupled with an internal sensor (e.g. a Hall sensor) that detects the movement of the trigger and generates or affects one or more signals corresponding to such movements, for example via interpolation using a firmware. According to some aspects, the proposed game controller may also include the button assembly serving as the interception member for interacting with the mechanical-type switch, for example including but not limited to, a linear switch, a tactile switch, or a click switch. The button assembly may be configured to actuate the mechanical switch in the "Hair Trigger Mode". Further, in the "Full Trigger Travel Mode", the internal sensor may be used to detect the movement of the trigger for detecting the movement of the trigger and generating a corresponding signal.

In some aspects of what is described here, a game controller may include a secondary switch, e.g. a trigger stop switch. Upon actuation of the secondary switch, the secondary switch may be configured to turn off the internal sensor function. For example, when the selector is toggled or switched to the first state (i.e. in the "Hair Trigger Mode"), the secondary switch may be activated such that the internal sensor may be turned off. Accordingly, with the internal sensor functions turned off, the internal sensor may not be detecting the movement of the trigger and/or the firmware may not be generating signals corresponding to such movements. Hence, the secondary switch may provide the option to reuse the existing firmware codes in the game controller of the various aspects without requiring to re-write firmware code. In other aspects, a game controller may not include a trigger stop switch. Accordingly, the firmware code may need to be replaced or rewritten such that one or more signals corresponding to the movement of the trigger may not be generated when the trigger is operating in the "Hair Trigger Mode".

In some instances, aspects of the systems and techniques described here provide technical improvements and advantages over existing approaches. For example, the proposed game controller may provide an improved user experience at least for the following reasons. The proposed game controller may be provided with the trigger. Further, the proposed game controller may be provided with the button assembly serving as the interception member for interacting with the mechanical-type switch. When the button assembly is disengaged (e.g. in the second state or in the "Full Trigger Travel Mode"), the trigger movement may be detected by the internal sensor (e.g. the Hall sensor) and output signals may be generated in accordance with the magnitude of trigger movement via the firmware. That is, the trigger's movement from the undepressed position to the fully depressed position (at about 20 degrees) may be interpolated by the processor running the firmware as linear accelerating values ranging from 0 to 100%. When the button assembly is engaged (e.g. in the first state or in the "Hair Trigger Mode"), the Hall sensor may be turned off and an output signal may be generated once the mechanical-type switch is actuated by the trigger via the button assembly, to indicate that the trigger is depressed. Accordingly, the engagement of the button assembly in the "Hair Trigger Mode" may provide a quicker response for the trigger during video game use, modify the mapping scheme/profile of electrical signals generated by the game controller and continue to communicate with the video game console to activate the relevant functionality in the video game despite the shorter path along which the trigger may move.

Further, the button assembly (or the interception member) may be configured to move in a plane perpendicular to a plane where the travel path is in. In particular, the button assembly may be movable in an axis perpendicular to the plane where the travel path is in. Accordingly, the button assembly may move in a direct and shorter distance from the second (disengaged) state to the first (engaged) state and thus provides a faster response in toggling the operation modes. Further, the button assembly may be configured to actuate the mechanical-type switch and the mechanical-type switch may in turn produce an audible click sound and/or provide a clicking tactile sensation for the user, thereby providing a better user experience for the user.

The following examples pertain to various aspects of the present disclosure.

Example 1 is a game controller including: a trigger movable along a travel path extending from an undepressed position to a fully depressed position; a selector operable to alternate between a first state and a second state, wherein the trigger is operable in a first operation mode when the selector is in the first state and operable in a second operation mode when the selector is in the second state; an interception member operatively associated with the selector, the interception member being moved to intercept the trigger at a first intermediate position along the travel path when the selector is in the first state and moved away from the first intermediate position to keep clear of the travel path when the selector is in the second state; a switch disposed relative to the trigger in a manner so as to be actuatable by the interception member when the selector is in the first state, wherein, when the selector is in the first state, the trigger is depressible to engage the interception member at the first intermediate position along the travel path and further depressible to move the interception member from the first intermediate position to a second intermediate position along the travel path in a manner so as to actuate the switch with the interception member, wherein, when the selector is in the second state, the trigger is movable along a full extend of the travel path between the undepressed position and the fully depressed position.

In Example 2, the subject matter of Example 1 may optionally include that the trigger is rotatable about a pivot axis so as to be movable along the travel path having an arc-shaped.

In Example 3, the subject matter of Example 2 may optionally include that an angular displacement of the trigger between the undepressed position and the fully depressed position with respect to the pivot axis is about 20 degrees, and an angular displacement of the trigger between the undepressed position and the second intermediate position with respect to the pivot axis is about 6 degrees.

In Example 4, the subject matter of Example 2 may optionally include that the travel path is in a first plane perpendicular to the pivot axis.

In Example 5, the subject matter of Example 4 may optionally include that when the selector is toggled from the second state to the first state, the interception member is being moved to the first intermediate position by moving along a second plane perpendicular to the first plane.

In Example 6, the subject matter of Example 5 may optionally include that when the selector is toggled from the second state to the first state, the interception member is moved to the first intermediate position by moving along a first axis, the first axis being perpendicular to the first plane.

In Example 7, the subject matter of any one of Examples 1 to 6 may optionally include a lever operatively associated with the selector; and a secondary switch coupled to the lever, wherein when the selector is toggled from the second state to the first state, the lever interacts with the secondary switch to toggle from a second mode to a first mode.

In Example 8, the subject matter of Example 7 may optionally include that the lever is coupled to the selector with a spring.

In Example 9, the subject matter of Example 7 may optionally include a Hall sensor configured to produce a magnetic signal as a measure of a movement of the trigger, wherein the Hall sensor is turned on when the secondary switch is in the second mode and the Hall sensor is turned off when the secondary switch is in the first mode.

In Example 10, the subject matter of any one of Examples 1 to 9 may optionally include a stopper attached to the selector, wherein when the selector is toggled from the second state to the first state, the stopper is moved to intercept the trigger at the second intermediate position along the travel path such that the travel path of the trigger is intercepted by the stopper.

In Example 11, the subject matter of any one of Examples 1 to 10 may optionally include that the switch comprises a mechanical-type switch capable of producing an audible click sound or providing a clicking tactile sensation or both upon being actuated.

In Example 12, the subject matter of any one of Examples 1 to 11 may optionally include that the interception member comprises a push button and a push button slide bracket, and wherein the push button is coupled to the push button slide bracket.

In Example 13, the subject matter of Example 12 may optionally include that the push button slide bracket comprises a first rail, and a second rail parallel to the first rail, wherein a channel is formed between the first rail and the second rail, wherein the push button is held within the channel between the first rail and the second rail, wherein, when the interception member is in the first state, the interception member is in a disposition with the push button being directly between the trigger and the switch.

In Example 14, the subject matter of any one of Examples 1 to 13 may optionally include that the selector comprises a coupling structure, and wherein the interception member comprises a corresponding coupling structure, wherein the coupling structure of the selector and the corresponding coupling structure of the interception member are engaged to each other in a manner such that, when the selector is being toggled, a movement of the selector is transferred from the coupling structure of the selector to the corresponding coupling structure of the interception member for moving the interception member in a synchronous manner.

In Example 15, the subject matter of Example 14 may optionally include that the coupling structure of the selector is a hook structure and the corresponding coupling structure of the interception member is a handle structure.

In Example 16, the subject matter of any one of Examples 1 to 15 may optionally include a biasing member coupled to the trigger to bias the trigger towards the undepressed position.

In Example 17, the subject matter of any one of Examples 1 to 16 may optionally include a housing, wherein the housing comprises a trigger aperture, the trigger being movable to retract and extend with respect to the trigger aperture.

In Example 18 the subject matter of Example 17 may optionally include that the housing comprises an elongated slot and the selector comprises a pin-like structure extending through the elongated slot, wherein the pin-like structure is slidable from a first end of the slot to a second end of the slot for toggling between the first state and the second state.

In Example 19, the subject matter of Example 18 may optionally include that the elongated slot is adjacent to the trigger within easy reach of a user.

In Example 20, the subject matter of Example 19 may optionally include that the trigger is rotatably mounted on a peg that extends from an inner surface of the housing.

In Example 21, the subject matter of any one of Examples 1 to 20 may optionally include the trigger comprises a trigger button and a trigger bracket supporting the trigger button.

In Example 22, the subject matter of Example 21 may optionally include that the trigger bracket comprises a ledge structure connected to a base of the trigger button, an elongated structure extending from the ledge structure on a side of the ledge structure opposite the trigger button, and a holding structure to hold a magnet at a distance from the ledge structure on the side of the ledge structure opposite the trigger button.

In Example 23, the subject matter of Example 22 may optionally include that when the selector is in the first state, the trigger is movable such that a free end tip of the elongated structure of the trigger bracket abuts the interception member at the first intermediate position along the travel path of the trigger.

In Example 24, the subject matter of Example 22 may optionally include that the trigger is movable in a manner so as to move the magnet held by the holding structure of the trigger bracket relative to a Hall sensor.

In Example 25, the subject matter of any one of Examples 1 to 24 may optionally include a processor configured to communicate an output signal to a gaming console based on activation of the switch when the selector is in the first state.

In Example 26, the subject matter of Example 25 may optionally include that the processor is configured to communicate a range of output signals based on interpolation of a trigger's movement from the undepressed position to the fully depressed position when the selector is in the second state.

In Example 27, the subject matter of Example 25 may optionally include that the processor is configured to communicate a range of output signals based on interpolation of a trigger's movement from the undepressed position to the first intermediate position when the selector is in the first state.

Figure 2:
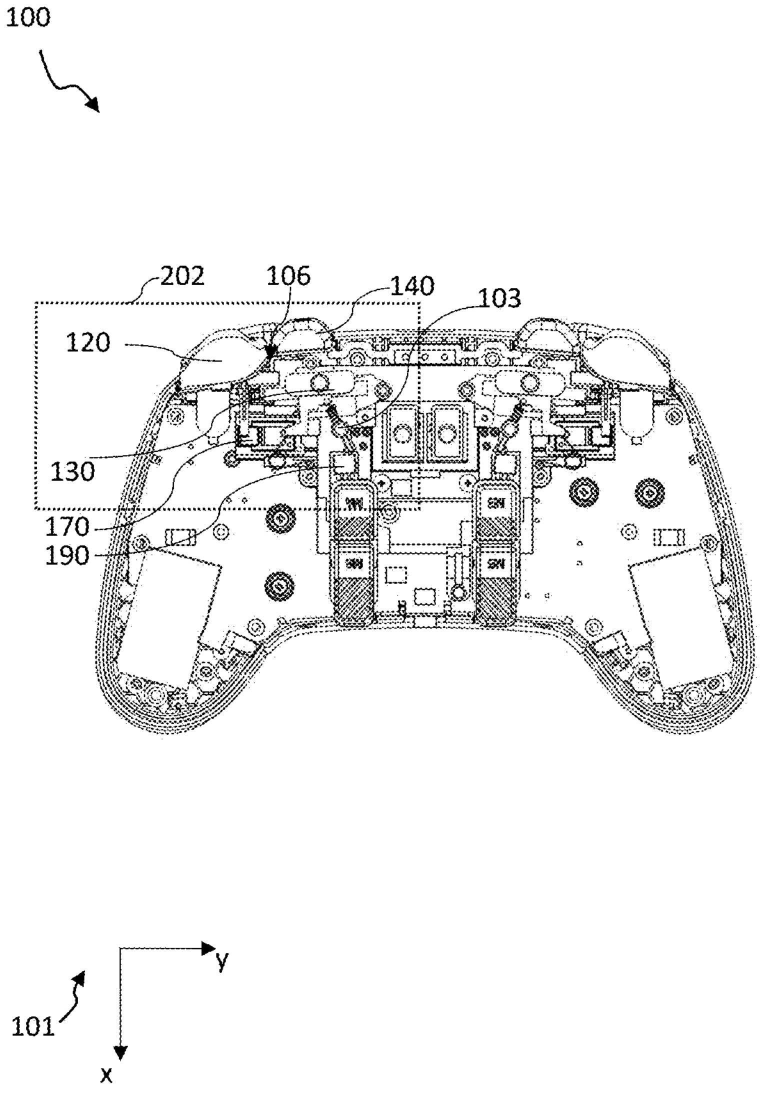
FIG. 2 is a diagram showing a back view of the example game controller of FIG. 1 without the back portion of the housing.

FIG. 1 is a back view of a game controller 100 according to an embodiment of the present disclosure. FIG. 2 is a back view of the game controller 100 of FIG. 1 without a back portion of a housing 110 of the game controller 100 and showing the interior of the game controller 100. FIG. 1 and FIG. 2 as well as other figures as discussed below also show a frame of reference 101 having three orthogonal axes. The frame of reference 101 includes a first axis in a first direction (e. g., the X-direction), a second axis in a second direction (e. g., the Y-direction), and a third axis in a third direction (e. g., the Z-direction). The first, second, and third directions are perpendicular to each other.

According to various non-limiting embodiments, referring to FIG. 1, the game controller 100 may be a hand-held device for receiving user input in video games. FIG. 1 depicts the back view of the game controller 100, e. g. in an X-Y plane. As shown in FIG. 1, the game controller 100 may include a housing 110. The game controller 100 may have a set of controls on the housing 110, for example, two triggers 120, two sets of two selectors 130, 150, two multifunction buttons 140 and two sets of two multifunction bottom triggers 160 may be placed on the housing 110. Each of the controls, e. g. the multifunction buttons 140, the bottom triggers 160, may be mapped to at least one gaming function. One or more of these controls can be operatively coupled (e. g. mechanically and/or electrically coupled) to one or more internal components housed within the housing 110.

According to various non-limiting embodiments, the internal components of the game controller 100 may include an electronic circuit module (not shown). The electronic circuit module may include printed circuit boards, or any other suitable electronic circuit. The electronic circuit module may be coupled, by wire or wirelessly, to a gaming device (e.g. a gaming console). The controls may be configured to interact with the electronic circuit module of the game controller 100 for a user to provide inputs to the gaming device, to which the game controller 100 may be connected, via actuating the switches associated with the controls of the game controller 100.

Some features of the game controller 100 that are shown in FIG. 1 are not described in details for purpose of brevity and the game controller 100 may include further features not shown in FIG. 1. In some implementations, the game controller 100 may include one or more controls, such as one or more buttons, one or more joysticks, one or more directional pads, one or more triggers that may be exposed or accessible through the housing 110 and operated by a user with fingers. Game controllers to which embodiment apply may have different shapes, different sizes, different numbers and/or placements of controls, and/or other differences from game controller 100 shown in FIG. 1. For example, the game controller 110 as shown in FIG. 1 has a mirror symmetric configuration along a central line AA' with two sets of same controls for two hands of the user disposed symmetrically on left and right sides of the game controller 100; however, it shall not be limited to such a symmetric configuration and include game controllers having a single set of controls for using with one hand of the user and game controllers having two sets of different controls for twos hands of the user.

The housing 110 may be formed by one or more interlocking pieces (e.g., front and back portions). The housing 110 may be made from any suitable material(s), including plastic (e.g., injection molded), metal or combination of metals/alloys, etc. FIG. 2 depicts the interior of the game controller 100 without the back portion of the housing 110.

Figure 3A:
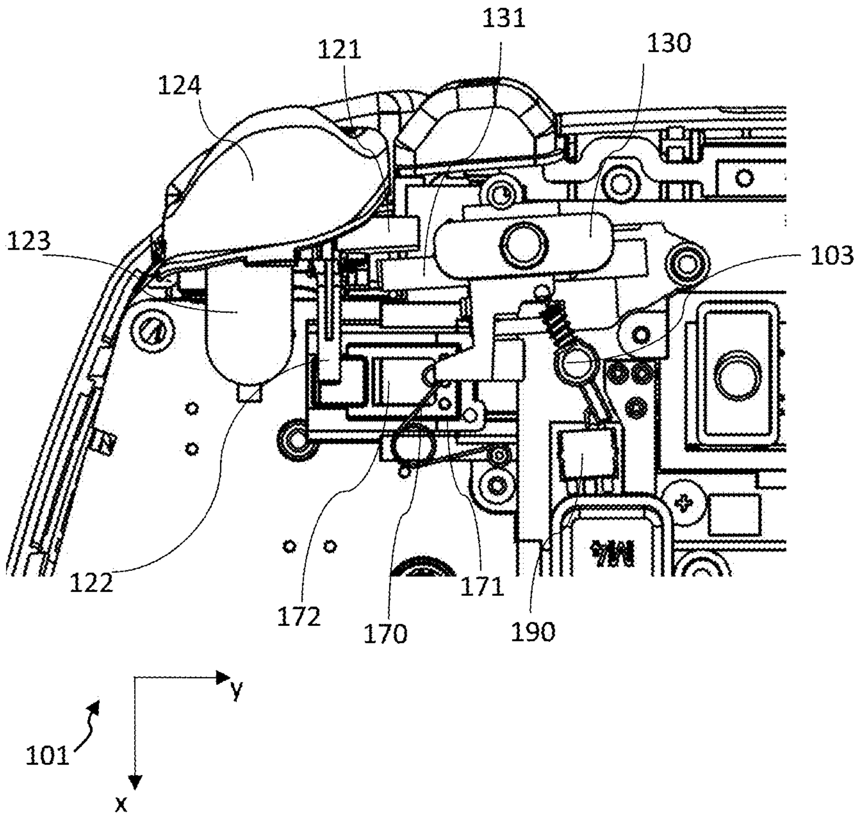
FIG. 3A is a diagram showing a partial back view of the example game controller shown in FIG. 2 in the first operation mode.
Figure 3B:
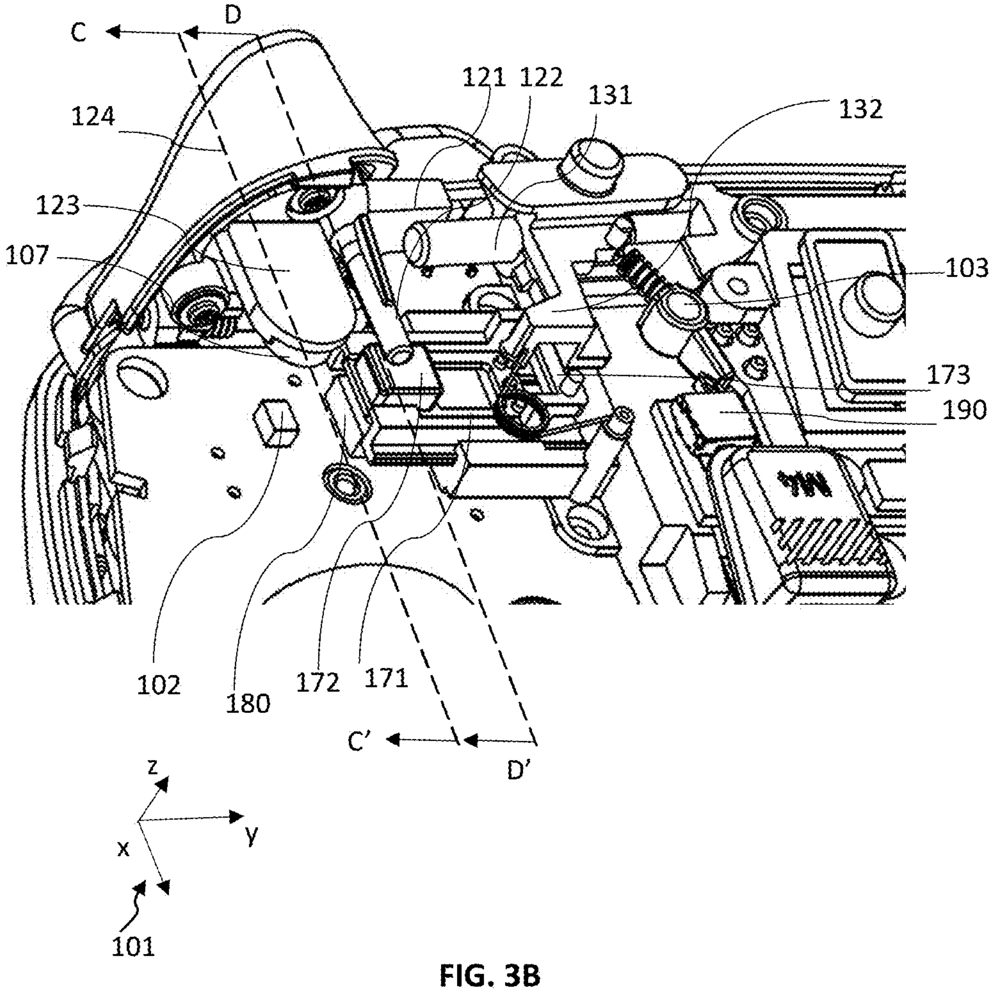
FIG. 3B is a diagram showing a partial perspective view of the example game controller shown in FIG. 3A.

According to various non-limiting embodiments, referring to FIG. 2, the game controller 100 may include the triggers 120, the selectors 130, the interception members 170 and the switches 180 (as shown in FIG. 3B). Although it shows two sets of same controls for the game controller 100, it should be appreciated that the game controller 100 may have one set of controls including one trigger 120, one selector 130, one interception member 170, one switch 180 and other controls. Accordingly, the description below will be discussed with reference to one set of controls of the game controller 110, particularly, the control set on the left side of the game controller 110 as denoted 202.

Figure 5A:
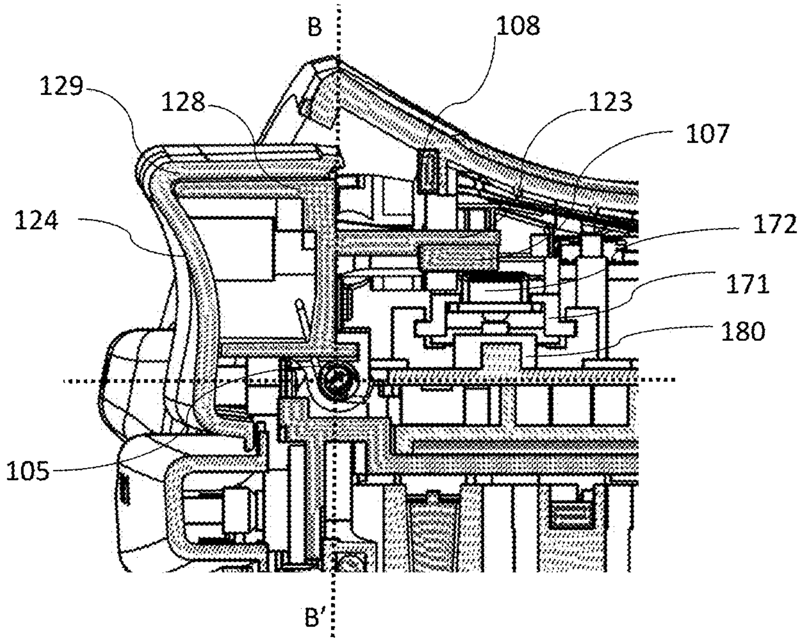
FIG. 5A is a diagram showing a partial side cross-sectional view of the example game controller of FIG. 1 in an undepressed position.

The housing 110 may comprise a trigger aperture 106, and the trigger 120 may be movable to retract and extend with respect to the trigger aperture 106. The trigger 120 may be mechanically coupled with the housing 110, for example, via a biasing member 105 mounted on a protrusion extending from an inner surface of the housing 110 (as shown in FIG. 5A). The biasing member 105 may be coupled to the trigger 120 to bias the trigger 120 towards an undepressed position (as shown in FIG. 5A). The biasing member 105 may be a spring loaded hinge. An undepressed position is where the trigger 120 does not receive any depression exerted from the user, namely, a default position of the trigger 120. The trigger 120 may be formed as a single piece or can be assemblies of multiple pieces. The trigger 120 may be manufactured from any suitable material(s), including plastic (e. g., injection molded), metal or a combination of metals/alloys, etc. Depressing the trigger 120 may cause an action to be performed (e. g., selection of a television channel, firing a weapon within a game being played by the user, a particular motion of a character (e. g., jumping, sprinting) in a game being played by the user, and/or other out-of-game or in-game actions).

Figure 5B:
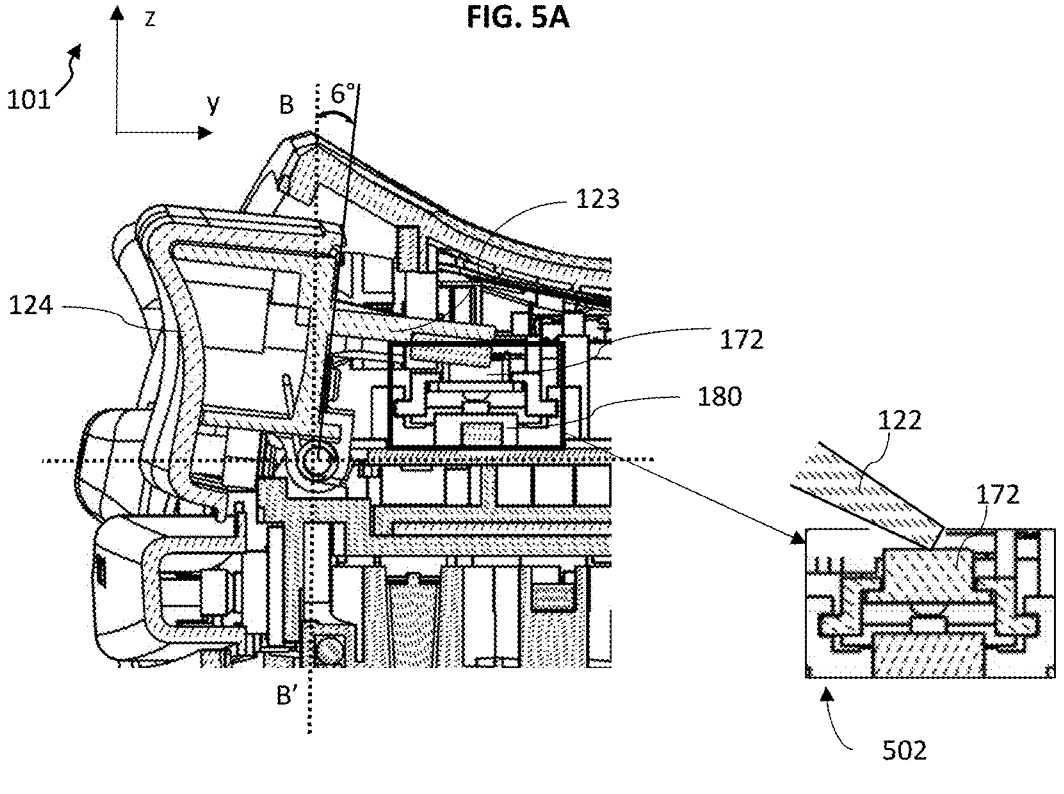
FIG. 5B is a diagram showing a partial side cross-sectional view of the example game controller of FIG. 1 in a depressed position in the first operation mode.
Figure 5C:
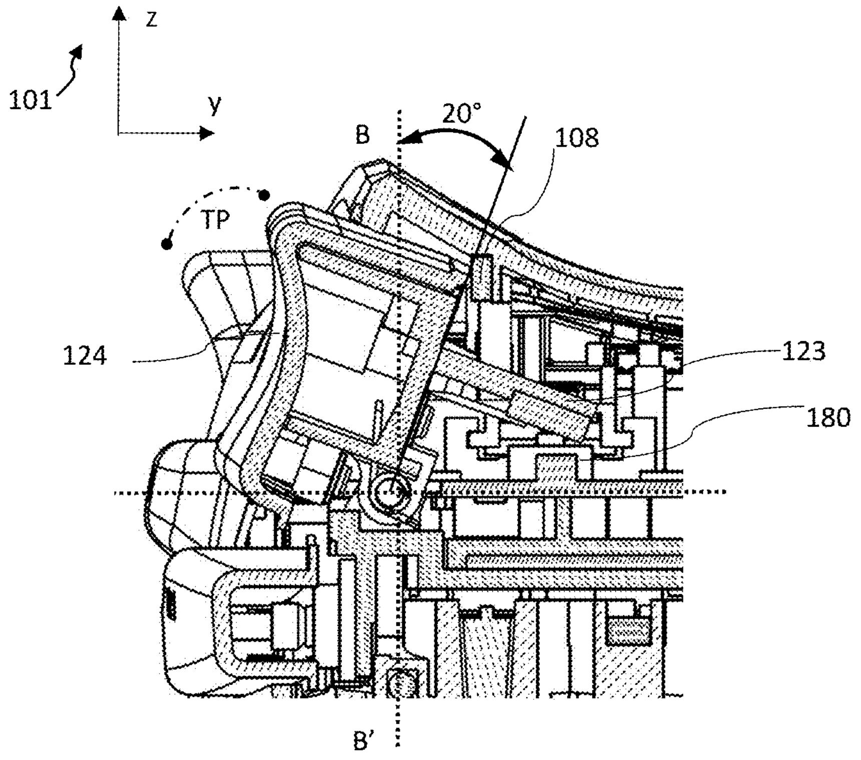
FIG. 5C is a diagram showing a partial side view of the example game controller of FIG. 1 in a depressed position in the second operation mode.

The trigger 120 may be depressible or otherwise movable along a travel path extending from the undepressed position to a fully depressed position (as shown in FIG. 5C denoted "TP"). A fully depressed position is where the trigger 120 is physically stopped or blocked by another structure (e. g., a portion of the housing, or a structure coupled with the housing such as a guide stopper 108 as shown in FIG. 5A), in other words, a farthest position that the trigger 120 is capable to travel along the travel path. At the fully depressed position, further exertion of force on the trigger 120 would no longer move the trigger 120. Accordingly, from the undepressed position to the fully depressed position defines a maximum span that the trigger 120 may travel along the travel path. In some implementations, the trigger 120 may be rotatable about a pivot axis (e. g. BB') so as to be movable along the travel path having an arc-shaped as shown in FIGS. 5B and 5C. The arc-shaped travel path may be centered about the pivot of the pivot axis. When depressed, the trigger 120 may be tilted or pivoted to a certain degrees towards the inside of housing 110 of game controller 100, and then when released, may spring back (e. g., via the spring loaded hinge) to the undepressed position. The path along which the trigger 120 (or a portion of trigger 120) moves when depressed (e. g., between the undepressed position and the fully depressed position) is referred to herein as the "travel path" as shown in FIG. 5C denoted "TP". The movement of the trigger 120 will be further discussed with reference to FIGS. 5A, 5B and 5C.

In some other implementations, the trigger may be configured to make a linear displacement to a certain distance towards the inside of housing 110 of game controller 100, when depressed. That is, the trigger may be movable from an undepressed position to a fully depressed position along a straight line.

According to various non-limiting embodiments, the selector 130 may be operable to alternate between a first state and a second state, wherein the trigger 120 is operable in a first operation mode (e.g. "Hair Trigger Mode") when the selector 130 is in the first state and operable in a second operation mode (e.g. "Full Trigger Travel Mode") when the selector 130 is in the second state. FIG. 2 shows the selector 130 is in the first state. The selector may be actuated by a user from the exterior of the housing 110, for example, including but not limited to, moving a lever, a pin, a post, a slider, a knob, etc., touching a capacitive or other touch-sensitive switch, applying pressure to a squeeze switch, etc. In some implementation, the housing 110 may include an elongated slot 109 (as shown in FIG. 1) and the selector 130 may comprises a pin-like structure extending through the elongated slot 109, wherein the pin-like structure is slidable from a first end of the slot to a second end of the slot for toggling between the first state and the second state. The first end may be the left end and the second end may be the right end of the elongated slot 109. FIG. 1 shows the selector is at the left end of the elongate slot 109 and thus in the first state. The elongated slot 109 is adjacent to the trigger within easy reach of the user without requiring the user to change the grip on the trigger 120 to toggle the selector 130.

Toggling the state of the selector 130 may toggle or switch the operating mode of trigger 120. For example, toggling of the operation mode of the trigger 120 to a first operation mode (e.g. the selector 130 at the left end of the elongated slot 109 as shown in FIG. 1) may actuate a switching mechanism (e.g., a switch, relay, electronic signal, etc.) of the game controller 100 to effect a first mapping scheme/profile of electrical output signals communicated from the game controller 100 to a gaming console. Similarly, toggling of the operation mode of the trigger 120 to a second operation mode (e.g. the selector 130 at the right end of the elongated slot 109 as shown in FIG. 1) may actuate another switching mechanism (e.g., a switch, relay, electronic signal, etc.) of the game controller 100 to effect a second mapping scheme/profile of electrical output signals communicated from the game controller 100 to the gaming console. The first operation mode of the trigger 120 may be referred to a "Hair Trigger Mode" and the second operation mode of the trigger 120 may be referred to a "Full Trigger Travel Mode". The operation modes of the trigger 120 will be discussed below with reference to FIGS. 3A to 5C.

According to various non-limiting embodiments, the interception member 170 may be operatively associated with the selector 130. The interception member 170 may be moved to intercept the trigger 120 at a first intermediate position along the travel path when the selector 130 is in the first state as shown in FIG. 2 and may be moved away from the first intermediate position to keep clear of the travel path when the selector 130 is in the second state. The first intermediate position may be located between the undepressed position and the fully depressed position along the travel path. When the interception member 170 is at the first intermediate position, the interception member 170 may cut off or block the travel path of the trigger 120, namely, obstruct or intercept the trigger 120 at the first intermediate position such that the trigger 120 may come into contact or abut or engage the interception member 170 when the trigger 120 is being depressed, thereby truncating the travel path.

According to various non-limiting embodiments, the game controller 100 may include a lever 103 operatively associated with the selector 130 and a secondary switch 190 coupled to the lever 103. When the selector 130 is toggled from the second state to the first state, the lever 103 may interact with the secondary switch 190 to toggle from a second mode to a first mode. Similarly, when the selector 130 is toggled from the first state to the second state, the lever 103 may interact with the secondary switch 190 to toggle from the first mode to the second mode. The lever 103 may be coupled to the selector 130 with a spring. Although a lever 130 is shown herein, other suitable coupling mechanism including mechanical or electrical coupling mechanisms may be included, for example, any coupling mechanism such that a toggle of the selector 130 from the first state to the second state toggles or switches the secondary switch 190 from the first mode to the second mode, and a toggle of the selector 130 from the second state to the first state toggles or switches the secondary switch 190 from the second mode to the first mode.

The switch 180 (as shown in FIG. 3B) may be disposed relative to the trigger in a manner so as to be actuatable by the interception member 170 when the selector 130 is in the first state. The switch 180 may be disposed along the travel path of the trigger 120. The switch 180 may include a mechanical-type switch capable of producing an audible click sound or providing a clicking tactile sensation or both upon being actuated. The switch 180 may be a tactile switch used to detect the movement of the trigger 120.

When the selector 130 is in the first state, the trigger 120 may cause the interception member 170 to push on the tactile switch 180, thereby actuating the tactile switch 180. The actuation of the tactile switch 180 may serve as an indication that the trigger 120 is being depressed in the first operation mode. Also in the first operation mode of the trigger 120, a Hall sensor (e.g. 102 as shown in FIG. 3A) (or other sensor present) may be turned off by the secondary switch 190, whereas in the second operation mode of the trigger 120, the Hall sensor may generate output signals corresponding to the positions of the trigger 120 along the travel path.

Figure 4A:
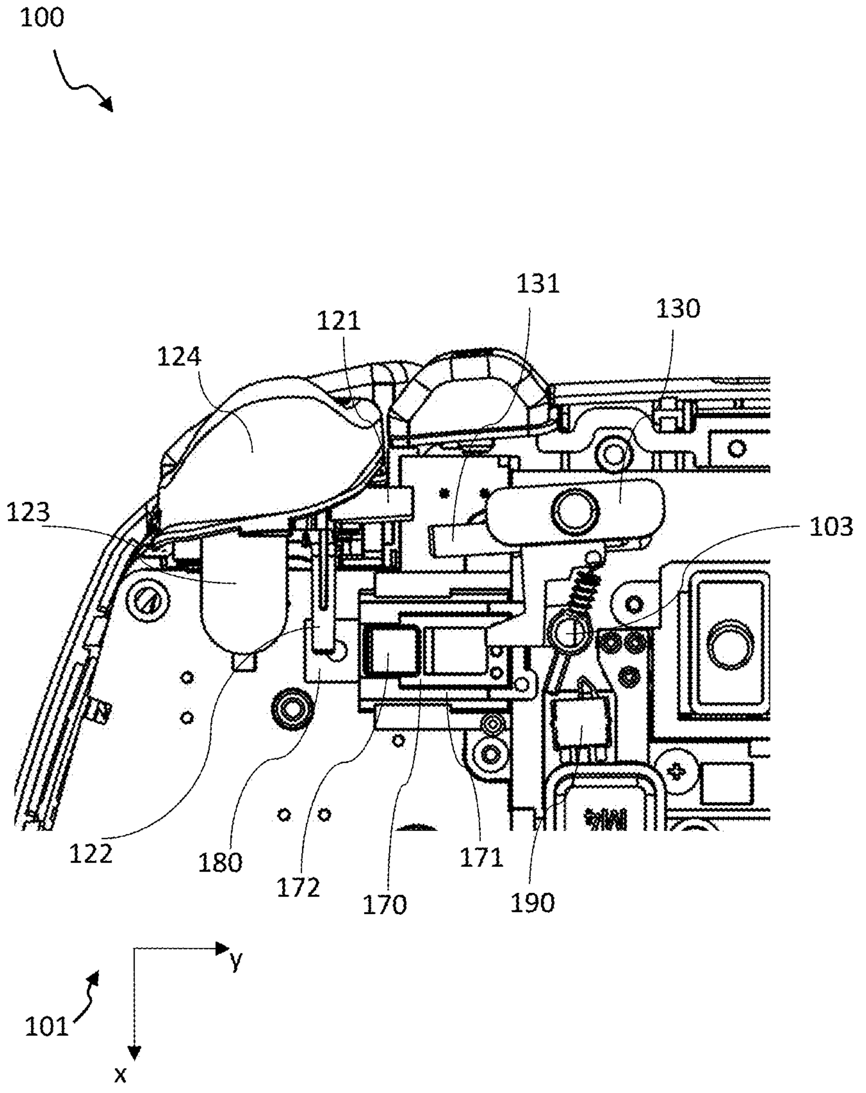
FIG. 4A is a diagram showing a partial back view of the example game controller shown in FIG. 2 in a second operation mode.
Figure 4B:
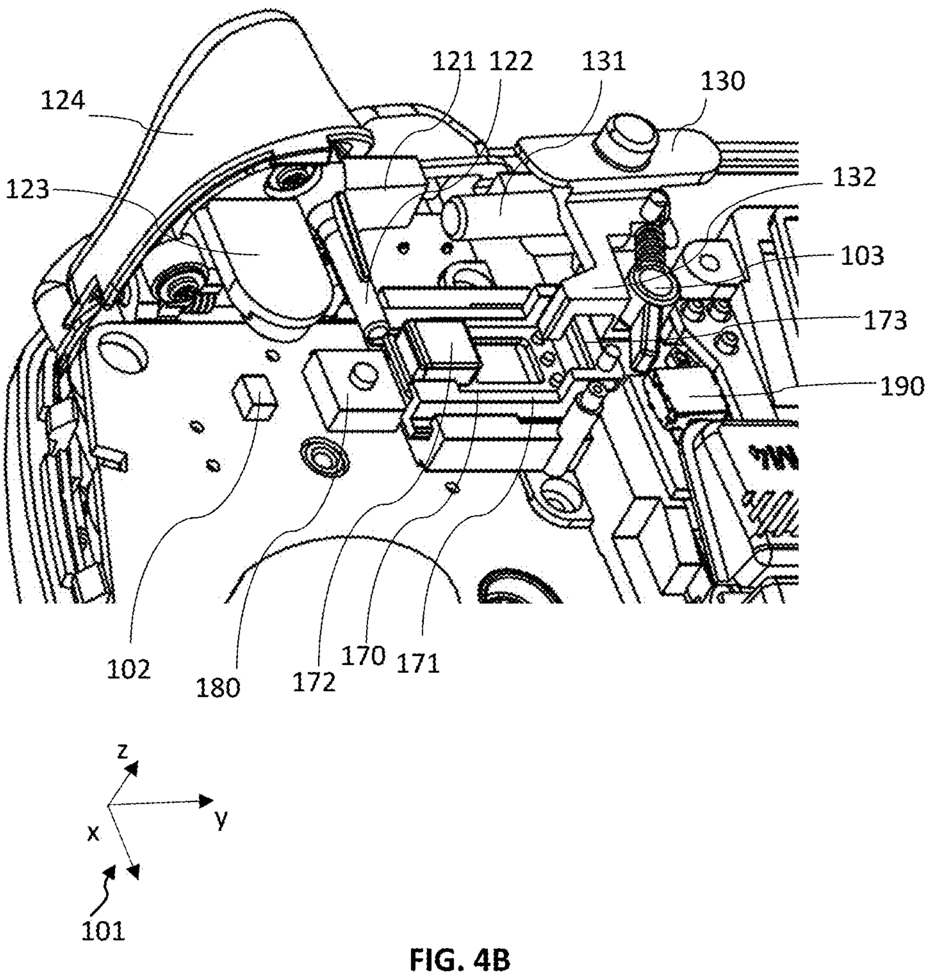
FIG. 4B is a diagram showing a partial perspective view of the example game controller shown in FIG. 4A.

Now referring to FIGS. 3A, 3B, 4A, 4B and 5A to 5C, the different operation modes of the trigger 120 of the game controller 100 will be discussed. FIG. 3A illustrates a partial back view of the game controller 100 shown in FIG. 2 as denoted 202 in the first operation mode; FIG. 3B illustrates a partial perspective view of the game controller 100 shown in FIG. 3A. FIG. 4A illustrates a partial back view of the game controller 100 shown in FIG. 2 as denoted 202 in the second operation mode; FIG. 4B illustrates a partial perspective view of the game controller 100 shown in FIG. 4A. FIG. 5A illustrates a partial side cross-sectional view of the game controller 100 of FIG. 1 in the undepressed position along the line CC' of FIG. 3B; FIG. 5B illustrates a partial side cross-sectional view of the game controller 100 of FIG. 1 in the second intermediate depressed position in the first operation mode along the line CC' of FIG. 3B, and the inset 502 of the FIG. 5B illustrates an enlarged cross-section view along the line DD' of FIG. 3B; FIG. 5C illustrates a partial side cross-sectional view of the game controller 100 of FIG. 1 in the full depressed position in the second operation mode along the line CC' of FIG. 3B.

With reference to FIG. 3B, more features of the game controller 100 will be discussed before moving on to discuss the operation modes of the trigger 120 of the game controller 100.

According to non-limited various embodiments, the trigger 120 may include a trigger button 124 and a trigger bracket 128 (as shown in FIG. 5A) supporting the trigger button 124. The trigger bracket 128 may include a ledge structure 121 connected to a base 129 (as shown in FIG. 5A) of the trigger button 124, an elongated structure 122 extending from the ledge structure 121 on a side of the ledge structure 121 opposite the trigger button 124, and a holding structure 123 to hold a magnet 107 at a distance from the ledge structure 121 on the side of the ledge structure 121 opposite the trigger button 124. The trigger 120 may be movable in a manner so as to move the magnet 107 held by the holding structure 123 of the trigger bracket 128 relative to a Hall sensor 102.

The game controller 100 may include the Hall sensor 102 configured to produce a magnetic signal as a measure of a movement of the trigger 120. The Hall sensor may be a transducer that varies its output voltage in response to a magnetic field. Accordingly, movement of the trigger 120 may move the magnet 107 (e.g., attached to the holding structure 123) closer to or further away from the Hall sensor 102 to generate a corresponding sensor signal. The sensor signal may be generated as a higher or lower voltage, corresponding to a distance of the magnet being closer or further away from the Hall sensor 102. The sensor signal may be compared to a threshold voltage value by electrical circuitry of the game controller 100. In some implementations, if the sensor signal exceeds the threshold value, this means the trigger 120 may be depressed fully, and if the sensor signal is less than the threshold value, this means the trigger 120 may be depressed partially. In some implementations, the Hall sensor 102 may be turned on when the secondary switch 190 is in the second mode and the Hall sensor 102 may be turned off when the secondary switch 190 is in the first mode.

According to non-limited various embodiments, the interception member 170 may include a button 172 and a button slide bracket 171, and wherein the button 172 is coupled to the button slide bracket 171. The button slide bracket 171 may include a first rail (e. g. an upper rail), and a second rail (e. g. a lower rail) parallel to the first rail, wherein a channel is formed between the first rail and the second rail and the button 172 is held within the channel between the first rail and the second rail (as shown in FIG. 5A). When the interception member 170 is in the first state, the interception member 170 may be in a disposition with the button 172 being directly between the trigger 120 and the switch 180, and the switch 180 may be partially disposed in the channel of the button slide bracket 171. For example, the button 172 may be slid together with the button slide bracket 171 so as to be positioned directly between the trigger 120 and the switch 180. The button 172 may include a flat surface for receiving the trigger 120, particularly, for receiving the elongated structure 122 of the trigger 120. The flat surface of the button 172 may be in a plane (e. g. the X-Y plane) perpendicular to the travel path of the elongated structure 122 of the trigger 120 so as to provide a steady and stable upholding for the elongated structure 122. The button 172 may have a height and/or may be positioned so that, when the button 172 is at the first intermediate position (i. e. the interception member 170 is at the first intermediate position), the travel path of the trigger 120 is truncated by a desirable length by the interception of the push button 172.

According to non-limited various embodiments, the selector 130 may include a coupling structure 132, and the interception member 170 may include a corresponding coupling structure 173, wherein the coupling structure 132 of the selector 130 and the corresponding coupling structure 173 of the interception member 170 are engaged to each other in a manner such that, when the selector 130 is being toggled, a movement of the selector 130 is transferred from the coupling structure 132 of the selector 130 to the corresponding coupling structure 173 of the interception member 170 for moving the interception member 170 in a synchronous manner. The coupling structure 132 of the selector 130 may be a hook structure and the corresponding coupling structure 173 of the interception member 170 may be a handle structure. It shall be appreciated that the coupling mechanism between the selector 130 and the interception member 170 is not limited to the description herein, and include any suitable coupling mechanisms.

The first operation mode (i. e. "Hair Trigger Mode") of the trigger 120 of the game controller 100 will be discussed with reference to FIGS. 3A, 3B, 5A and 5B. When the selector 130 is in the first state as shown in FIGS. 3A and 3B, the trigger 120 may be movable from the undepressed position as shown in FIG. 5A to where a free end tip of the elongated structure 122 of the trigger bracket 128 abuts the interception member 170 at the first intermediate position along the travel path of the trigger 120, and the trigger 120 may be further depressible to move the interception member 170 from the first intermediate position to a second intermediate position along the travel path in a manner so as to actuate the switch 180 with the interception member 170 as shown in FIG. 5B inset 502. That is, the trigger 120 including the ledge structure 121, the elongated structure 122 and the holding structure 123 may be rotatable about the pivot axis BB' (shown in FIGS. 5A, 5B and 5C) in the first operation mode. The trigger 120 may be blocked or intercepted by the interception member 170 at the first intermediate position. The second intermediate position is further to the first intermediate position by a distance needed for actuating the switch 180. Stately differently, at the first intermediate position, the interception member 170 is positioned over the switch 180; at the second intermediate position, the interception member 170 is pushed down by the trigger 120, and in turn pushes to activate the switch 180. The second intermediate position is a maximum movement span of the trigger 120 in the "Hair Trigger Mode". The pivot axis BB' may be parallel to the Z-direction. The travel path may be in a first plane (i. e. the Y-Z plane). In some implementations, when the selector 130 is toggled from the second state to the first state, the interception member 170 may be being moved to the first intermediate position by moving along in a second plane (i. e. the X-Y plane) perpendicular to the first plane. In some implementation, when the selector is toggled from the second state to the first state, the interception member 170 may be moved to the first intermediate position by moving along a first axis (i. e. the X-direction), the first axis being perpendicular to the first plane.

According to various non-limiting embodiments, the game controller 100 may further include a stopper 131 attached to the selector 130. When the selector 130 is in the first state, the stopper 131 may be moved to intercept the trigger 120 as the trigger 120 reaches the second intermediate position along the travel path such that the travel path of the trigger 120 is blocked or obstructed by the stopper 131. Accordingly, the stopper 131 may block or obstruct the trigger 120 from moving any further, thereby limiting or restricting the distance the trigger 120 is movable along the travel path within the undepressed position and the second intermediate position. Specifically, the stopper 131 attached to the selector 130 may block or obstruct or intercept the ledge structure 121 of the trigger 120 of the game controller 100. In the "Hair Trigger Mode", an angular displacement of the trigger 120 between the undepressed position and the second intermediate position with respect to the pivot axis BB' may be about 6 degrees.

The second operation mode (i.e. "Full Trigger Travel Mode") of the trigger 120 of the game controller 100 will be now discussed with reference to FIGS. 4A, 4B, 5A and 5C.

When the selector 130 is in the second state, the trigger 120 may be movable along a full extend of the travel path between the undepressed position and the fully depressed position. At the fully depressed position, the trigger 120 may be blocked by the guide stopper 108. In the "Full Trigger Travel Mode", an angular displacement of the trigger 120 between the undepressed position and the fully depressed position with respect to the pivot axis BB' may be about 20 degrees.

When the selector 130 is in the second state, the interception member 170 may be away from the travel path of the trigger 120. In other words, the interception member 170 may be withdrawn from intercepting the trigger 120 along the travel path. Accordingly, the stopper 131 attached to the selector 130 may be also free or withdrawn from intercepting the travel path of the ledge structure 121 of the trigger 120 of the game controller 100.

Figure 6:
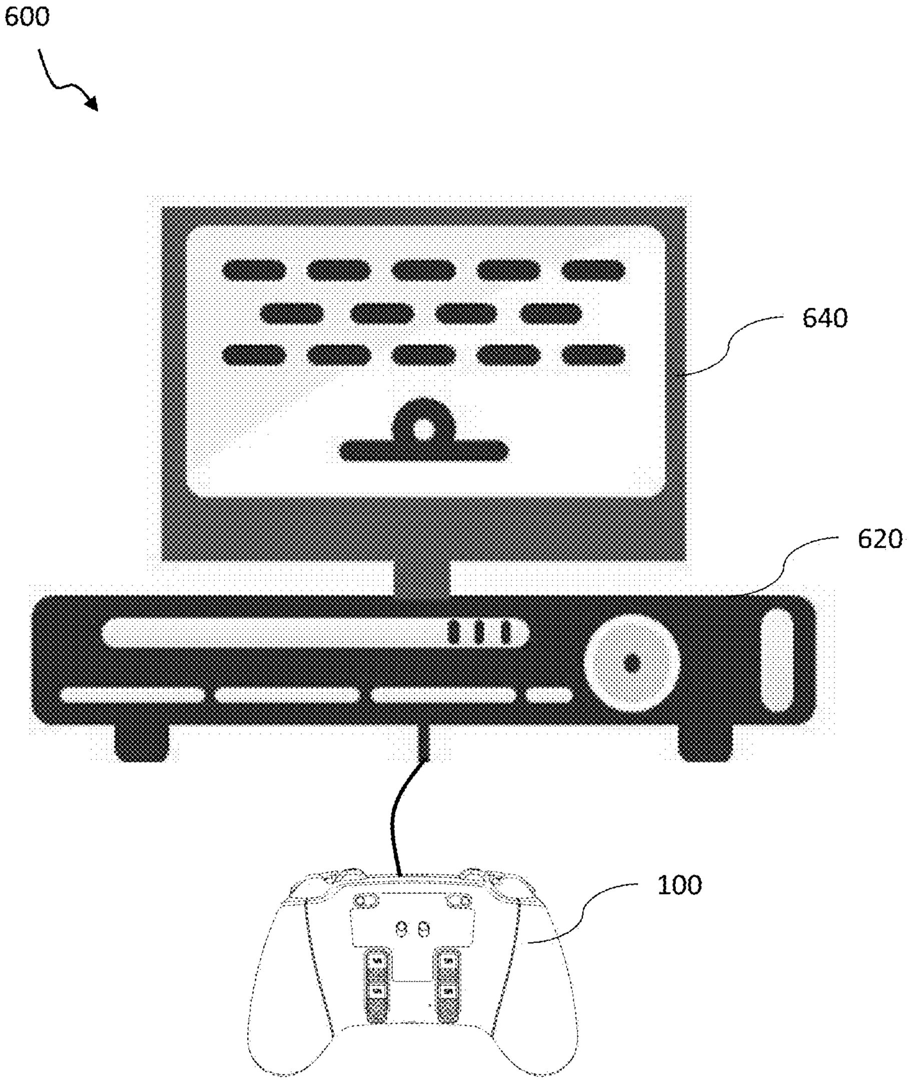
FIG. 6 is a diagram showing a gaming system for use with an example game controller, according to an embodiment of the present disclosure.

FIG. 6 shows a video game system 600 that can optionally include a display 640 (e. g., an electronic display, such as a television or computer monitor), a game console 620, and one or more video game controllers, such as the video game controller 100 with the trigger 120 as described above. The video game controller 100, the video game console 620, and/or the display 640 can be electrically and/or mechanically coupled with one another to facilitate video game play. The electrical circuitry included in the controller 100 may generate or alter an electrical signal based at least in part on movements of the trigger 120 and convey that signal to the console 640. The console 640 can process (e. g., with a computer processor) the signal it receives from the controller 100 and effectuate a gaming function or video game operation the signal is mapped to, which it can communicate to the display 640. Though FIG. 6 shows the controller 100, console 620 and display 640 coupled via wired connections (e. g., via wires), one or more of the controller 100, console 620 and display 640 can have circuitry (e. g., transmitter(s), receiver(s), transceiver(s)) that allow for wireless communication protocols to be employed between them. Moreover, in some implementations (not shown), the display 640, the console 620, and the controller 100 may all be comprised in a single device (e. g., a handheld video gaming device). Further, the controller 100, console 620 and/or display 640 can have computing modules (e. g., circuitry, electronics), discussed below in connection with FIG. 7, for implementing the operations disclosed herein.

Figure 7:
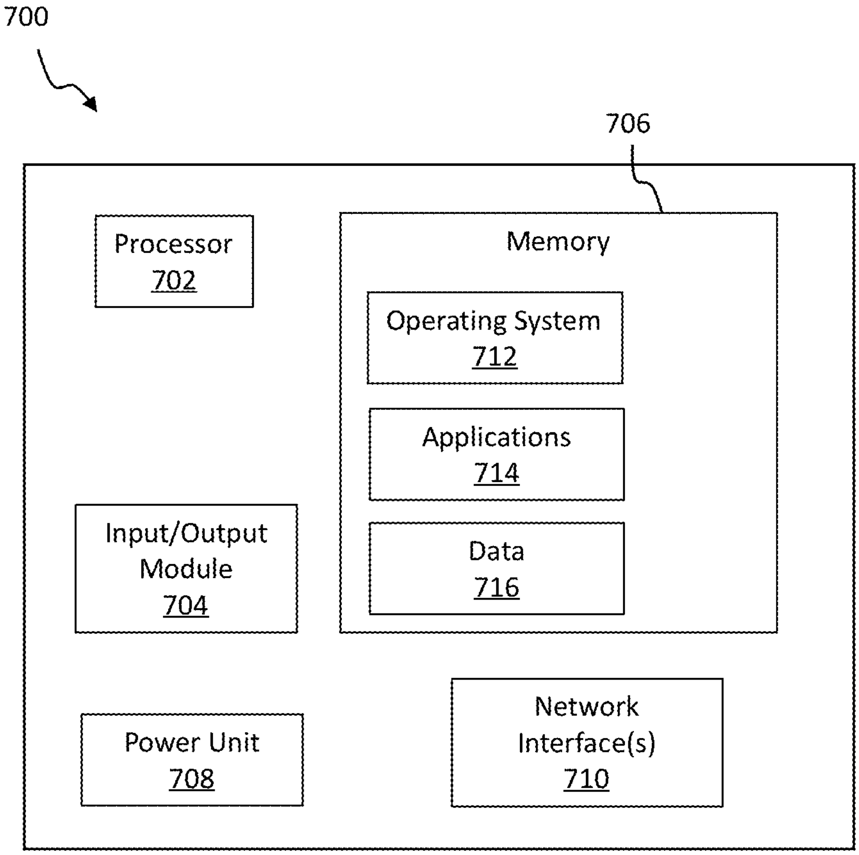
FIG. 7 is a block diagram showing an example electronic device, according to an implementation of the present disclosure.

FIG. 7 is a block diagram showing an example electronic device 700, according to an implementation of the present disclosure. The electronic device 700 may be a laptop computer, a desktop computer, a tablet computer, an automobile computer, a gaming device, a smart phone, a personal digital assistant, a server, or other electronic devices capable of running computer applications. In some implementations, the electronic device 700 includes a processor 702, an input/output (I/O) module 704, memory 706, a power unit 708, and one or more network interfaces 710. The electronic device 700 can include additional components. In some implementations, the processor 702, input/output (I/O) module 704, memory 706, power unit 708, and the network interface(s) 710 are housed together in a common housing or other assembly.

The example processor 702 can execute instructions, for example, to generate output data based on data inputs. The instructions can include programs, codes, scripts, modules, or other types of data stored in memory (e. g., memory 706). Additionally or alternatively, the instructions can be encoded as pre-programmed or re-programmable logic circuits, logic gates, or other types of hardware or firmware components or modules. The processor 702 may be, or may include, a multicore processor having a plurality of cores, and each such core may have an independent power domain and can be configured to enter and exit different operating or performance states based on workload. Additionally or alternatively, the processor 702 may be, or may include, a general-purpose microprocessor, as a specialized co-processor or another type of data processing apparatus. In some cases, the processor 702 performs high-level operation of the electronic device 700. For example, the processor 702 may be configured to execute or interpret software, scripts, programs, functions, executables, or other instructions stored in the memory 706.

The example I/O module 704 may include a mouse, keypad, touch screen, scanner, optical reader, and/or stylus (or other input device(s)) through which a user of the electronic device 700 may provide input to the electronic device 700, and may also include one or more of a speaker for providing audio output and a video display device for providing textual, audiovisual, and/or graphical output.

The example memory 706 may include computer-readable storage media, for example, a volatile memory device, a non-volatile memory device, or both. The memory 706 may include one or more read-only memory devices, random-access memory devices, buffer memory devices, or a combination of these and other types of memory devices. In some instances, one or more components of the memory can be integrated or otherwise associated with another component of the electronic device 700. The memory 706 may store instructions that are executable by the processor 702. In some examples, the memory 706 may store instructions for an operating system 712 and for application programs 714. The memory 706 may also store a database 716.

The example power unit 708 provides power to the other components of the electronic device 700. For example, the other components may operate based on electrical power provided by the power unit 708 through a voltage bus or other connection. In some implementations, the power unit 708 includes a battery or a battery system, for example, a rechargeable battery. In some implementations, the power unit 708 includes an adapter (e.g., an AC adapter) that receives an external power signal (from an external source) and coverts the external power signal to an internal power signal conditioned for a component of the electronic device 700. The power unit 708 may include other components or operate in another manner.

The electronic device 700 may be configured to operate in a wireless, wired, or cloud network environment (or a combination thereof). In some implementations, the electronic device 700 can access the network using the network interface(s) 710. The network interface(s) 710 can include one or more adapters, modems, connectors, sockets, terminals, ports, slots, and the like. The wireless network that the electronic device 700 accesses may operate, for example, according to a wireless network standard or another type of wireless communication protocol. For example, the wireless network may be configured to operate as a Wireless Local Area Network (WLAN), a Personal Area Network (PAN), a metropolitan area network (MAN), or another type of wireless network. Examples of WLANs include networks configured to operate according to one or more of the 802.11 family of standards developed by IEEE (e. g., Wi-Fi networks), and others. Examples of PANs include networks that operate according to short-range communication standards (e. g., BLUETOOTH®, Near Field Communication (NFC), ZigBee), millimeter wave communications, and others. The wired network that the electronic device 700 accesses may, for example, include Ethernet, SONET, circuit-switched networks (e. g., using components such as SS7, cable, and the like), and others.

Various aspects of what is described here have provided a game controller with improved controls and responses, thereby augmenting user experience.

Some of the subject matter and operations described in this specification can be implemented in digital electronic circuitry, or in computer software, firmware, or hardware, including the structures disclosed in this specification and their structural equivalents, or in combinations of one or more of them. Some of the subject matter described in this specification can be implemented as one or more computer programs, i. e., one or more modules of computer program instructions, encoded on a computer storage medium for execution by, or to control the operation of, data-processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e. g., multiple CDs, disks, or other storage devices).

Some of the operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e. g., an FPGA (field programmable gate array) or an ASIC (application specific integrated circuit). The apparatus can also include, in addition to hardware, code that creates an execution environment for the computer program in question, e. g., code that constitutes processor firmware, a protocol stack, a database management system, an operating system, a cross-platform runtime environment, a virtual machine, or a combination of one or more of them.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e. g., one or more scripts stored in a markup language document), in a single file dedicated to the program, or in multiple coordinated files (e. g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e. g., an FPGA (field programmable gate array) or an ASIC (application specific integrated circuit).

While this specification contains many details, these should not be understood as limitations on the scope of what may be claimed, but rather as descriptions of features specific to particular examples. Certain features that are described in this specification or shown in the drawings in the context of separate implementations can also be combined. Conversely, various features that are described or shown in the context of a single implementation can also be implemented in multiple implementations separately or in any suitable subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single product or packaged into multiple products.

A number of implementations have been described. Nevertheless, it will be understood that various modifications can be made. Accordingly, other implementations are within the scope of the following claims.

What is claimed is:

1. A game controller, comprising:
- a trigger movable along a travel path extending from an undepressed position to a fully depressed position;
- a selector operable to alternate between a first state and a second state, wherein the trigger is operable in a first operation mode when the selector is in the first state and operable in a second operation mode when the selector is in the second state;
- an interception member operatively associated with the selector, the interception member being moved to intercept the trigger at a first intermediate position along the travel path when the selector is in the first state and moved away from the first intermediate position to keep clear of the travel path when the selector is in the second state;
- a switch disposed relative to the trigger in a manner so as to be actuatable by the interception member when the selector is in the first state,
- wherein, when the selector is in the first state, the trigger is depressible to engage the interception member at the first intermediate position along the travel path and further depressible to move the interception member from the first intermediate position to a second intermediate position along the travel path in a manner so as to actuate the switch with the interception member,
- wherein, when the selector is in the second state, the trigger is movable along a full extend of the travel path between the undepressed position and the fully depressed position.

2. The game controller of claim 1, wherein the trigger is rotatable about a pivot axis so as to be movable along the travel path having an arc-shaped.

3. The game controller of claim 2, wherein an angular displacement of the trigger between the undepressed position and the fully depressed position with respect to the pivot axis is about 20 degrees, and an angular displacement of the trigger between the undepressed position and the second intermediate position with respect to the pivot axis is about 6 degrees.

4. The game controller of claim 2, wherein the travel path is in a first plane perpendicular to the pivot axis.

5. The game controller of claim 4, wherein when the selector is toggled from the second state to the first state, the interception member is being moved to the first intermediate position by moving along a second plane perpendicular to the first plane.

6. The game controller of claim 5, wherein when the selector is toggled from the second state to the first state, the interception member is moved to the first intermediate position by moving along a first axis, the first axis being perpendicular to the first plane.

7. The game controller of claim 1, further comprising:
- a lever operatively associated with the selector; and
- a secondary switch coupled to the lever,
- wherein when the selector is toggled from the second state to the first state, the lever interacts with the secondary switch to toggle from a second mode to a first mode.

8. The game controller of claim 7, wherein the lever is coupled to the selector with a spring.

9. The game controller of claim 7, further comprising:
- a Hall sensor configured to produce a magnetic signal as a measure of a movement of the trigger,
- wherein the Hall sensor is turned on when the secondary switch is in the second mode and the Hall sensor is turned off when the secondary switch is in the first mode.

10. The game controller of claim 1, further comprising:
- a stopper attached to the selector,
- wherein when the selector is toggled from the second state to the first state, the stopper is moved to intercept the trigger at the second intermediate position along the travel path such that the travel path of the trigger is intercepted by the stopper.

11. The game controller of claim 1, wherein the switch comprises a mechanical-type switch capable of producing an audible click sound or providing a clicking tactile sensation or both upon being actuated.

12. The game controller of claim 1, wherein the interception member comprises a push button and a push button slide bracket, and wherein the push button is coupled to the push button slide bracket.

13. The game controller of claim 12, wherein the push button slide bracket comprises a first rail, and a second rail parallel to the first rail, wherein a channel is formed between the first rail and the second rail, wherein the push button is held within the channel between the first rail and the second rail, wherein, when the interception member is in the first state, the interception member is in a disposition with the push button being directly between the trigger and the switch.

14. The game controller of claim 1, wherein the selector comprises a coupling structure, and wherein the interception member comprises a corresponding coupling structure, wherein the coupling structure of the selector and the corresponding coupling structure of the interception member are engaged to each other in a manner such that, when the selector is being toggled, a movement of the selector is transferred from the coupling structure of the selector to the corresponding coupling structure of the interception member for moving the interception member in a synchronous manner.

15. The game controller of claim 14, wherein the coupling structure of the selector is a hook structure and the corresponding coupling structure of the interception member is a handle structure.

16. The game controller of claim 1, further comprising a biasing member coupled to the trigger to bias the trigger towards the undepressed position.

17. The game controller of claim 1, further comprising:
- a housing,
- wherein the housing comprises a trigger aperture, the trigger being movable to retract and extend with respect to the trigger aperture.

18. The game controller of claim 17, wherein the housing comprises an elongated slot and the selector comprises a pin-like structure extending through the elongated slot, wherein the pin-like structure is slidable from a first end of the slot to a second end of the slot for toggling between the first state and the second state.

19. The game controller of claim 1, wherein the trigger comprises a trigger button and a trigger bracket supporting the trigger button, wherein the trigger bracket comprises a ledge structure connected to a base of the trigger button, an elongated structure extending from the ledge structure on a side of the ledge structure opposite the trigger button, and a holding structure to hold a magnet at a distance from the ledge structure on the side of the ledge structure opposite the trigger button.

20. The game controller of claim 1, further comprising:

a processor configured to communicate an output signal to a gaming console based on activation of the switch when the selector is in the first state.

* * * * *